US008516571B2

(12) United States Patent  (10) Patent No.: US 8,516,571 B2
Mikake                    (45) Date of Patent:     Aug. 20, 2013

(54) AUTHENTICATION METHOD AND INPUT DEVICE

(75) Inventor: Kana Mikake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 229 days.

(21) Appl. No.: 12/918,601

(22) PCT Filed: Feb. 25, 2009

(86) PCT No.: PCT/JP2009/053455
§ 371 (c)(1),
(2), (4) Date: Aug. 20, 2010

(87) PCT Pub. No.: WO2009/110363
PCT Pub. Date: Sep. 11, 2009

(65) Prior Publication Data
US 2010/0333198 A1  Dec. 30, 2010

(30) Foreign Application Priority Data
Mar. 4, 2008 (JP) ................ P2008-054146

(51) Int. Cl.
G06F 7/04 (2006.01)
(52) U.S. Cl.
USPC .......................................... 726/17
(58) Field of Classification Search
USPC .......................................... 726/17
See application file for complete search history.

(56) References Cited

U.S. PATENT DOCUMENTS

| 6,720,860 | B1 | 4/2004 | Narayanaswami |
| 2001/0027529 | A1 | 10/2001 | Sasabe et al. |
| 2003/0028784 | A1* | 2/2003 | Uchida ................... 713/186 |
| 2004/0113819 | A1 | 6/2004 | Gauthey et al. |
| 2005/0162407 | A1* | 7/2005 | Sakurai et al. ........... 345/173 |
| 2006/0143467 | A1 | 6/2006 | Kubo et al. |
| 2007/0030963 | A1 | 2/2007 | Wyld et al. |

FOREIGN PATENT DOCUMENTS

| CN | 1519771 A | 8/2004 |
| JP | 60-171560 A | 9/1985 |
| JP | 61-142835 A | 6/1986 |
| JP | 5-324560 A | 12/1993 |
| JP | 11-149454 A | 6/1999 |

(Continued)

OTHER PUBLICATIONS

European Search Report for corresponding European Patent Application No. 09718205.9, dated Dec. 6, 2011.

Primary Examiner — Philip Chea
Assistant Examiner — Daniel Hoan
(74) Attorney, Agent, or Firm — Birch, Stewart, Kolasch & Birch, LLP

(57) ABSTRACT

An authentication method and an input device are provided in which a password which a user has inputted in person can be easily reproduced, and it is unlikely for a password leak to occur even when peeped at. An authentication password includes position identification information disposed in an arbitrary position in an input section of an input device. Position identification information corresponding to a first indicated position of an input trajectory inputted from the input section is acquired. Based on the input trajectory, trajectory information representing repetitions of the trajectory from the first indicated position and movement information representing a movement direction with respect to the first indicated position are calculated. The acquired position identification information, and the calculated trajectory information and movement information are compared with preset setting information, and whether they correspond to the setting information is determined, thereby the authentication is carried out.

8 Claims, 11 Drawing Sheets

(56) References Cited

FOREIGN PATENT DOCUMENTS

| | | | |
|---|---|---|---|
| JP | 2000-29837 A | 1/2000 | |
| JP | 2001-209615 A | 8/2001 | |
| JP | 2002-82734 A | 3/2002 | |
| JP | 2003-51012 A | 2/2003 | |
| JP | 2004-213117 A | 7/2004 | |

* cited by examiner

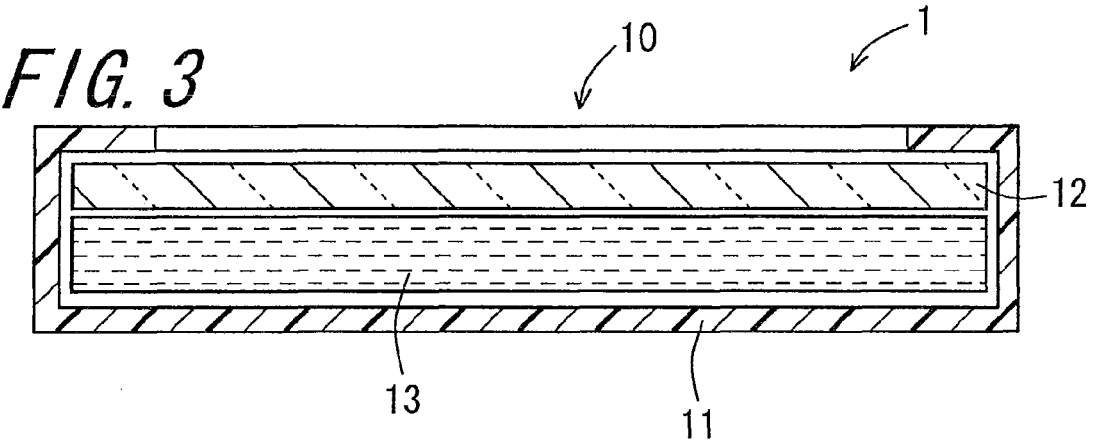
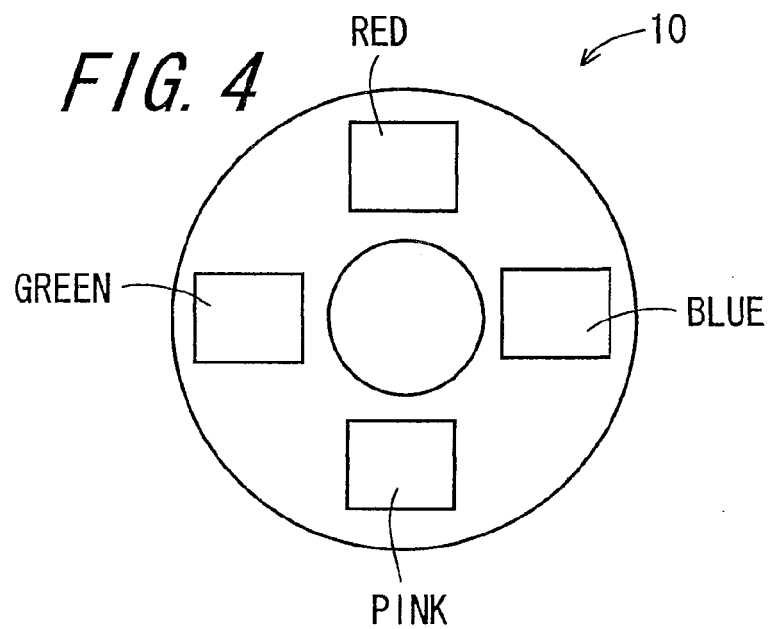

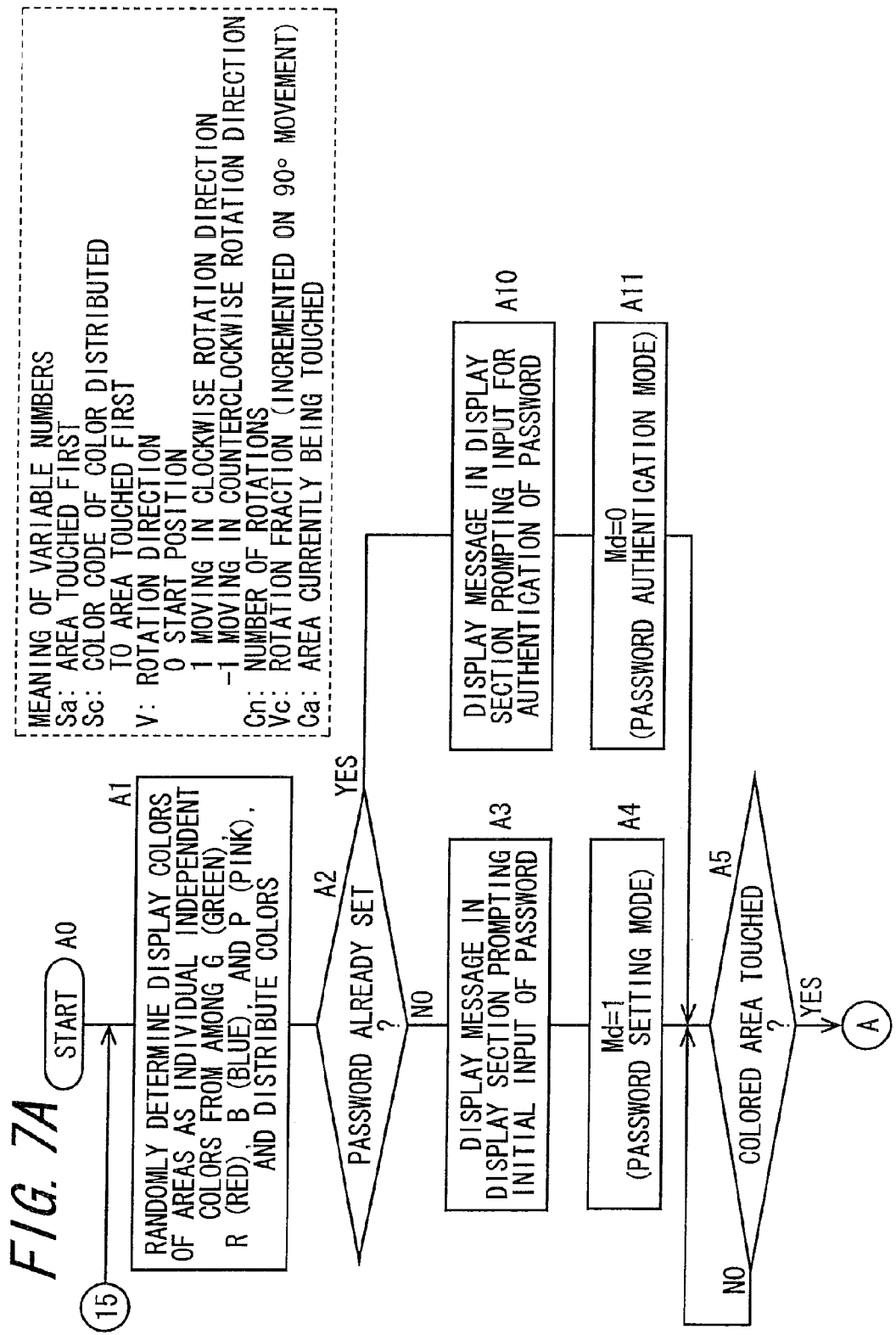

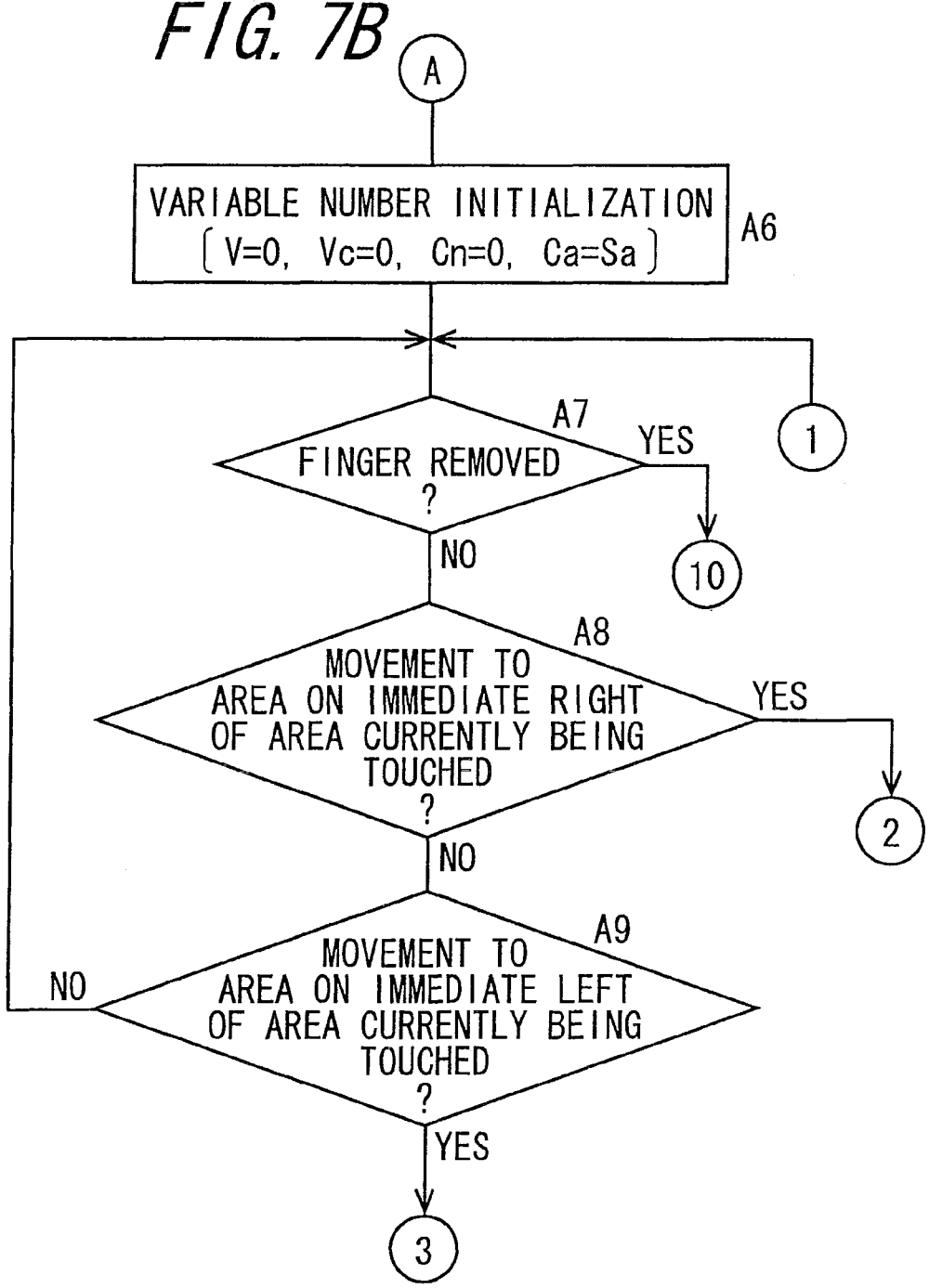

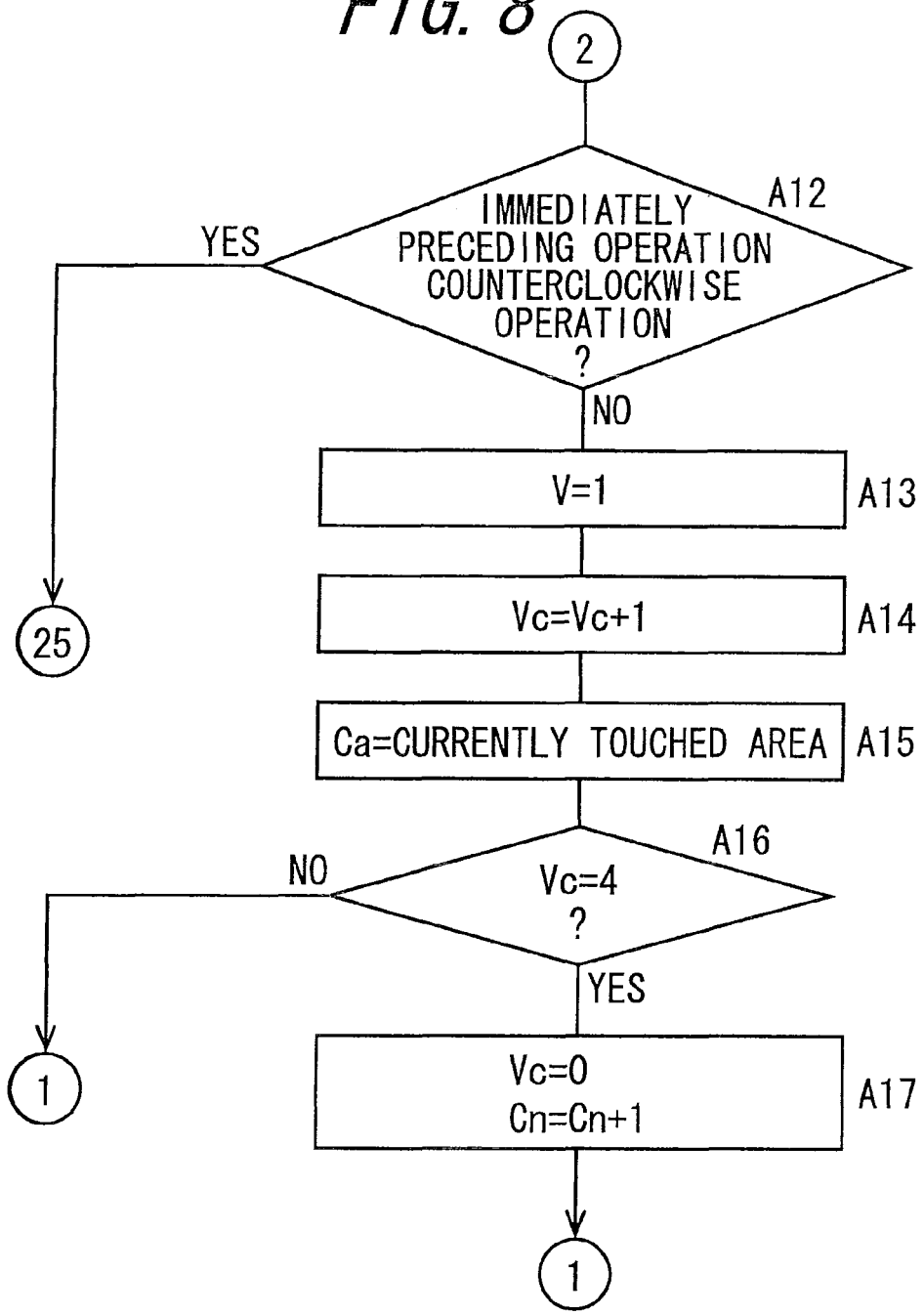

AUTHENTICATION METHOD AND INPUT DEVICE

TECHNICAL FIELD

The present invention relates to an authentication method and an input device for user authentication.

BACKGROUND ART

As protection of use of a terminal and system, and of data and contents, a determination of whether a user is legitimate depending on whether a password set and registered in advance, and a password inputted with keys when the terminal is used, and the like, coincide, is most common.

However, with this password method, there is a problem in that while a meaninglessly arranged password is easily forgotten and inconvenient, one's own or a family member's birthday, telephone number, or the like, is not easily forgotten, but is easily leaked or guessed at. In response to this, a graphic password method, which is an individual authentication technique using graphic data which is easy to remember in comparison with a password, has been proposed.

As related technology relating to a graphic password, in Japanese Unexamined Patent Application JP-A 60-171560 (1985), by carrying out a grid display in a specified portion of a display, or the like, and inputting a graphic as a password by indicating the grid display with a light pen, or the like, the password is easy for a user to remember, and upgraded security is obtained.

Also, in Japanese Unexamined Patent Application JP-A 61-142835 (1986), an authentication method is proposed whereby, by carrying out an authentication depending on whether a two-dimensional coordinate point registered in advance as a password by a user is included within a region enclosed by a closed curve indicated by two-dimensional graphic information inputted by the user, as well as the user being able to remember the password easily, and the authentication operation being easy, it is unlikely that the password will be detected by another person.

In Japanese Unexamined Patent Application JP-A 2004-213117, an authentication system is disclosed wherein, by inputting a random number positioned on crisscross lines including a graphic which is to be a password, in a matrix display in which a plurality of differing graphics are disposed, and authenticating depending on whether the random number coincides with a random number corresponding to a graphic correlated to a user ID, it is possible for a user, simply by memorizing an easily remembered graphic, to easily acquire a one-time password (a disposable password which is used once only) for him or herself only, and it is possible to prevent theft by peeping, or the like.

The heretofore described graphic password methods are broadly divided into two, the kind of method shown in JP-A 60-171560 which has a graphic trajectory as a password, and the kind of method shown in JP-A 2004-213117 which has an operation and information when selecting a graphic as a password. JP-A 61-142835 is a password method intermediate between the two.

At present, as individual authentication is required in a variety of life situations, and there are many occasions to input a password, from the point of view of preventing an information leak and protecting information, it is necessary for one individual to remember a large number of passwords. Consequently, even in the event that a portable terminal is accompanied by a secret function, because it is troublesome to have to remember a password, there is a tendency for the secret function not to be used when the effect of an information leak is small.

In the case of the heretofore described graphic password method which has a graphic trajectory as a password, there is a problem regarding a recognition accuracy element, whether it should be of an extent of character recognition of a password outputted by means of a graphic trajectory—whether a circle has been inputted, whether a triangle has been inputted, and the like—or whether it should go so far as to recognize whether the user is carrying out the operation in person. The recognition accuracy element varies depending on the usage situation. For example, with a mobile telephone for personal use, there are many situations in which a password is inputted while walking, and when considering the input of a graphic password in this kind of situation, it can be considered that unless the details can be easily remembered, they are not suitable for making into a password. In this kind of situation, it can be envisaged that even a case of incorporating "the size of the graphic" into the password may give rise to a situation wherein the user cannot unlock the password in person.

Meanwhile, in the event that a password outputted by means of a graphic trajectory is made a simple one wherein a circle is inputted, a triangle is inputted, or the like, although the user can easily remember the password in person, when considering a situation wherein the password is inputted while moving where a large number of strangers exist in the periphery, there is a possibility that cases of a password leak will increase due to the graphic password being peeped at by another person during the input operation.

DISCLOSURE OF INVENTION

An object of the invention is to provide an authentication method and an input device in which, due to simplicity of the password and unlikeliness of being forgotten, a password which a user has inputted in person can be easily reproduced, and it is unlikely for a password leak to occur even when peeped at, even amidst the existence of a large number of strangers.

The invention provides an authentication method in which authentication is carried out based on a password including position identification information disposed in an arbitrary position in an input section of an input device from which information can be inputted, the authentication method comprising the steps of:

acquiring position identification information corresponding to a first indicated position of an input trajectory inputted from the input section of the input device;

calculating, based on the input trajectory, trajectory information representing repetitions of the trajectory from the first indicated position, and movement information representing a movement direction with respect to the first indicated position; and comparing the acquired position identification information, and the calculated trajectory information and movement information, with preset setting information, and determining whether they correspond to the setting information.

Also, in the invention, it is preferable that the position in the input section of the input device in which the position identification information is disposed is set for every authentication.

Also, the invention provides an input device comprising an input section from which information can be inputted, the input device being capable of carrying out authentication based on a password configured from position identification information disposed in an arbitrary position in the input section, the input device comprising:

a position information allocation section which allocates a plurality of items of the position identification information uniquely to each position of a predetermined plurality of positions in the input section;

a storage section which stores information; and a determination section which acquires position identification information corresponding to a first indicated position of an input trajectory inputted from the input section, calculates, based on the input trajectory, trajectory information representing repetitions of the trajectory from the first indicated position, and movement information representing a movement direction with respect to the first indicated position, and compares the acquired position identification information, and the calculated trajectory information and movement information, with preset setting information stored in the storage section, and determines whether they correspond to the setting information.

Also, in the invention, it is preferable that the input device further comprises an output section, and in the event that it is determined that the acquired position identification information and the calculated trajectory information and movement information do not correspond to the setting information, the determination section, after determining completion of a series of input operations with the input section, causes warning information to be outputted in the output section.

According to the invention, a password is configured including position identification information disposed in an arbitrary position in an input section of an input device, and an authentication is carried out by acquiring position identification information corresponding to a first indicated position of an input trajectory inputted from the input section, calculating, based on the input trajectory, trajectory information representing repetitions of the trajectory from the first indicated position, and movement information representing a movement direction with respect to the first indicated position, comparing the acquired position identification information, and the calculated trajectory information and movement information, with preset setting information, and determining whether they correspond to the setting information. In the event that a graphic password is made a simple one wherein a circle is inputted, a triangle is inputted, or the like, there is a possibility that cases of a password leak will increase due to the graphic password being peeped at by another person during the input operation, and the details of the graphic password being ascertained by the other person, but according to the invention, although the password looks like a graphic trajectory when seen by another person, as the password is configured of the first input position identification information, trajectory information, and movement information, it is unlikely for a password leak to occur even when peeped at amidst the existence of a large number of strangers. Also, as it is possible to easily remember the correct password due to the password being configured of three simple items, the first input position identification information, trajectory information, and movement information, the kind of situation wherein the user cannot unlock the password in person does not arise, and input is easy even while moving, meaning that it is possible to provide an authentication method particularly suited to application in a product which is frequently used when moving, such as a mobile telephone.

BRIEF DESCRIPTION OF DRAWINGS

Other and further objects, features, and advantages of the invention will be more explicit from the following detailed description taken with reference to the drawings wherein:

FIG. 3 is a sectional view of an input section seen from a cross-sectional line III-III of FIG. 2;

FIG. 4 is a diagram showing specific examples of the circle pad segmented;

FIG. 7A is a flowchart showing operational processes of the control section;

FIG. 7B is a flowchart showing operational processes of the control section;

FIG. 8 is a flowchart showing operational processes of the control section;

BEST MODE FOR CARRYING OUT THE INVENTION

Figure 1:
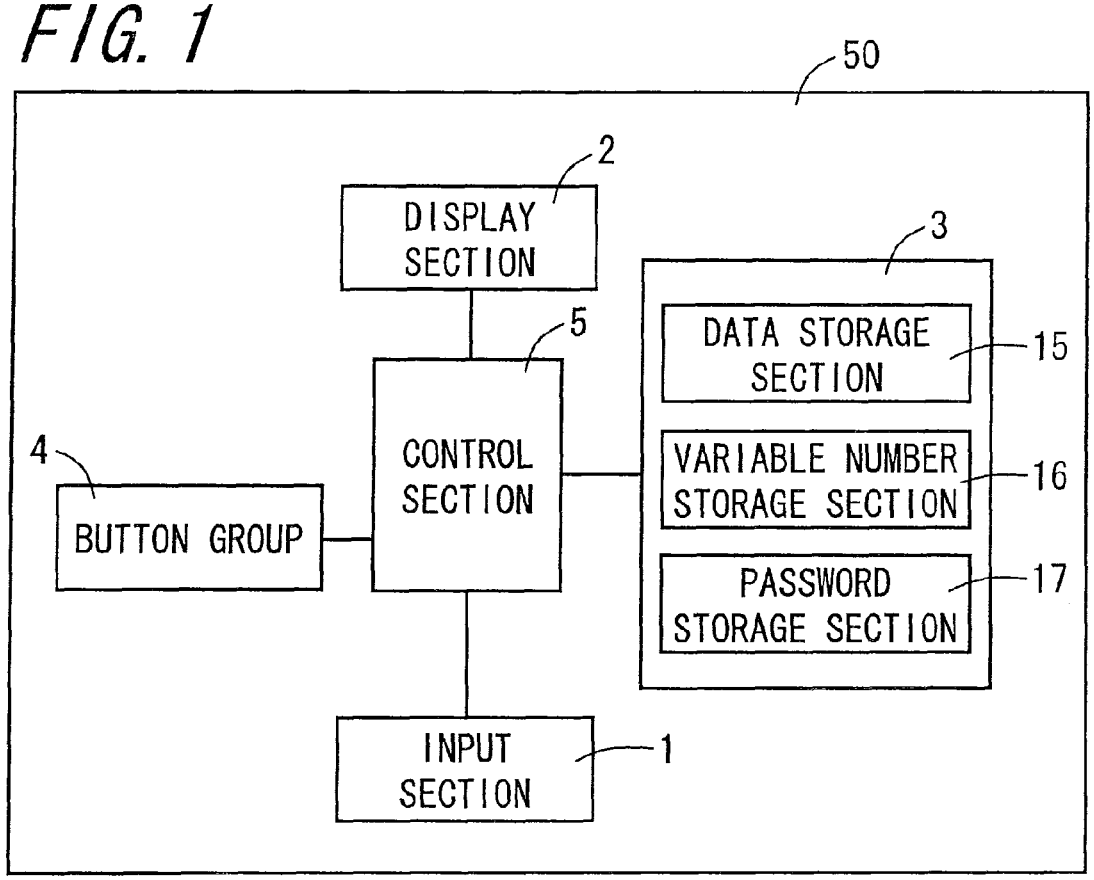
FIG. 1 is a block diagram showing an electrical configuration of an input device according to an embodiment of the invention.

Now referring to the drawings, preferred embodiments of the invention are described below.

Figure 2:
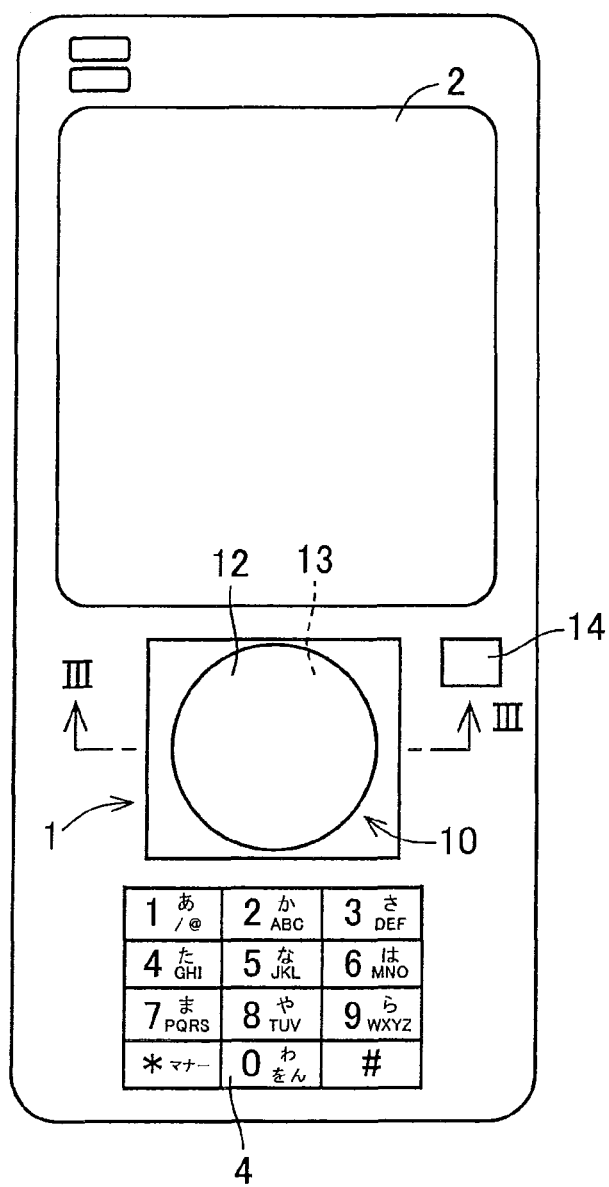
FIG. 2 is an external view of the input device of FIG. 1.

FIG. 1 is a block diagram showing an electrical configuration of an input device 50 according to an embodiment of the invention. FIG. 2 is an external view of the input device 50 of FIG. 1. FIG. 3 is a sectional view of an input section 1 seen from a cross-sectional line III-III of FIG. 2.

The input device 50, as shown in FIGS. 1 and 2, is configured including the input section 1, from which information can be inputted, a display section 2, which is an output section, a storage section 3, a control section 5, which is a position information allocation section and a determination section, a button group 4, and a power button 14. The input device 50 into which information can be inputted carries out an authentication based on a password configured including position identification information disposed in an arbitrary position in the input section 1.

Figure 5:
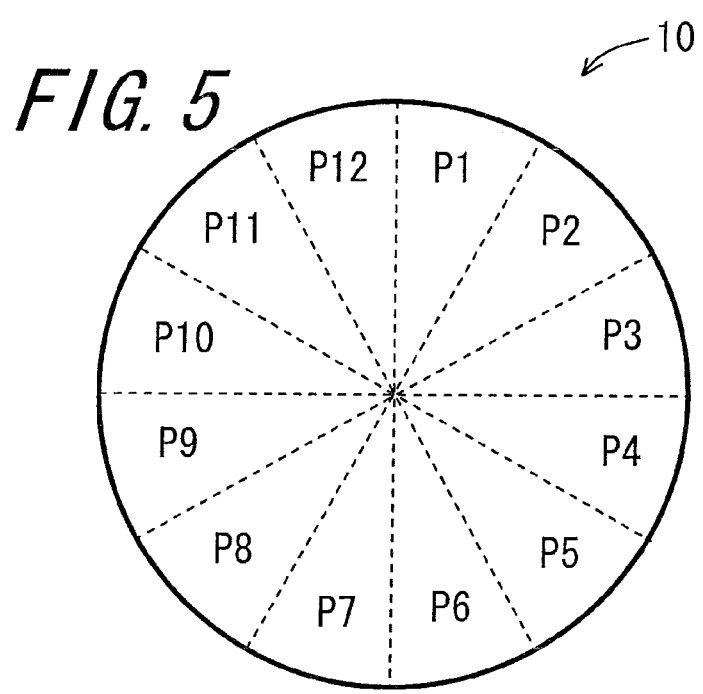
FIG. 5 is a diagram showing specific examples of the circle pad segmented.

The input section 1, as shown in FIGS. 2 and 3, has a housing 11, a touch panel 12, and a sub-display section 13. The housing 11 having a circular cutaway portion, a circle pad 10 is formed of a portion included in a right cylinder including a region of the touch panel 12 and sub-display section 13 exposed through the cutaway portion of the housing 11. The circle pad 10 is a portion of the input section 1 which a user actually operates with a finger. Also, the touch panel 12 and sub-display section 13 are provided in an internal portion enclosed by the housing 11. The touch panel 12 has a PET (polyethylene terephthalate) film, a transparent conductive film, an electrode, and the like. The sub-display section 13 is provided under the touch panel 12, on the side opposite that of the cutaway portion of the housing 11, and is realized by a liquid crystal display. The sub-display section 13 displays a position which should be touched as operation information, and an input trajectory to be inputted from the input section 1 is specified by the user touching the operating surface of the circle pad 10 based on the display. The circle pad 10 is segmented into regions which the user can touch for each item of indicated detail. FIGS. 4 and 5 are diagrams showing specific examples of the circle pad 10 segmented. As shown in FIGS. 4 and 5, the circle pad 10 can be segmented by, for example, dotted lines, colors, character displays, and the like. On the circle pad 10 shown in FIG. 4, regions given four colors are disposed so as to be rotationally symmetrical around an axis line passing through the center of the circle pad 10. The regions are mutually distanced around the axis line. On the circle pad 10 shown in FIG. 5, it being divided into twelve equal portions around the axis line, characters from P1 to P12 are displayed in the regions.

The display section 2 is realized by a liquid crystal display, an organic EL (electric luminescence) display, or the like, and displays information inputted from the input section 1 and button group 4, information stored in the storage section 3, and the like. Also, the display section 2 displays warning information to be described hereafter. Also, a sound display by means of a speaker, which is a sound output section, may also be carried out as an output section.

The storage section 3 is configured of, for example, a storage device such as a semiconductor memory, and stores information. The storage section 3 includes a data storage section 15 which stores telephone directory data and the like, a variable number storage section 16 which stores variable numbers, and a password storage section 17 which stores passwords. A set password which is preset setting information, is stored in the password storage section 17. Also, a control program for controlling the input device 50, and screen information to be displayed in the display section 2, are also stored in the storage section 3.

The button group 4 is formed of keys for inputting numbers and characters, keys for carrying out various kinds of setting or function switching in the input device 50, and the like.

The power button 14 carries out a switching on and off of power.

The password is configured of three elements; a mark representing a starting point position when inputting the password which is position identification information corresponding to a first indicated position of the input trajectory input from the input section 1, a number of rotations which is trajectory information representing repetitions of the trajectory from the first indicated position based on the input trajectory, and a rotation direction which is movement information representing a direction of movement with respect to the first indicated position. The starting point position when inputting the password is specified by a mark such as a color or character display which is a segment of the circle pad 10, and the display position of the mark is randomly displayed each time the password is inputted. The number of rotations represents a number of revolutions of the indicated position wherein one revolution is defined as sequential movement of the indicated position around the central axis line of the circle pad 10 from the starting point position when inputting the password to a point of returning to the original starting point or to the starting point region. The movement information, being a direction when the user sees a rotation direction of movement from the starting point facing the operating surface, represents a clockwise rotation or a counterclockwise rotation. With the input section 1 from which the password is inputted, as a trajectory describing one revolution around the central axis line of the circle pad 10 forms a (unicursal) graphic shape in which a predetermined starting point and finishing point coincide, the generation logic of a graphic password is extremely easy in comparison with that heretofore known.

Figure 6A:
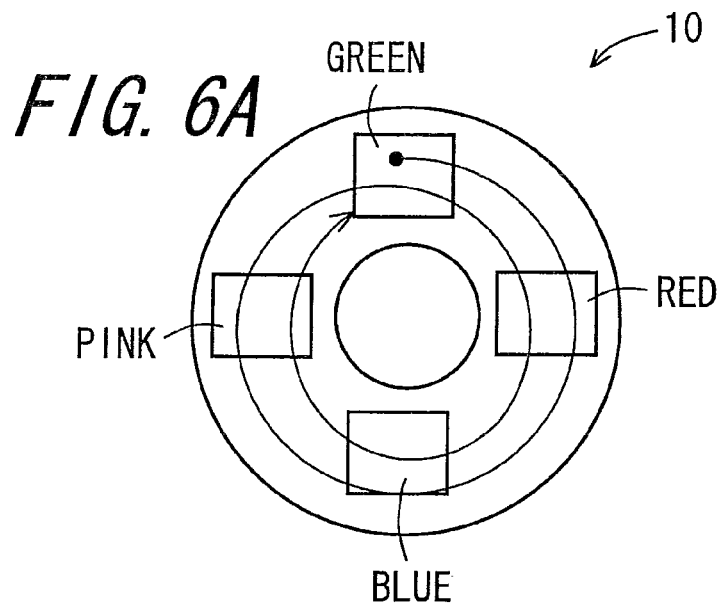
FIG. 6A is a diagram showing specific examples of a password.
Figure 6B:
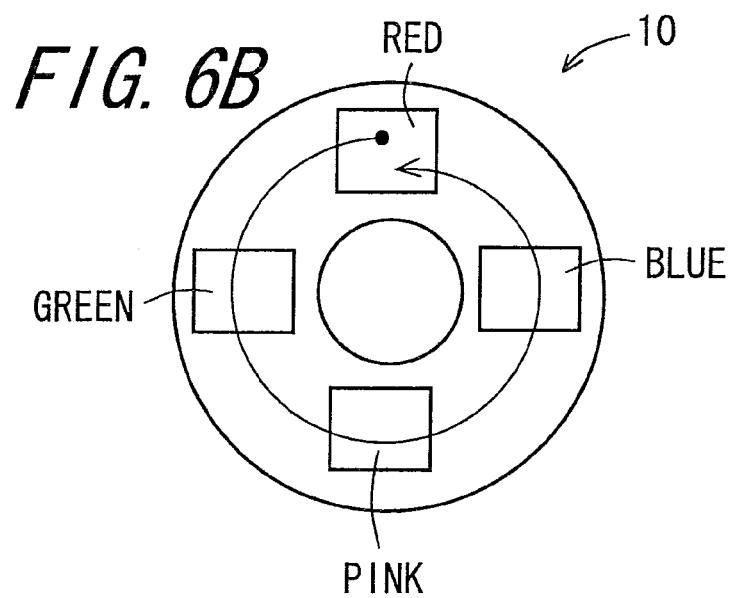
FIG. 6B is a diagram showing specific examples of a password.

FIGS. 6A and 6B are diagrams showing specific examples of a password. FIGS. 6A and 6B show a password in a case in which the circle pad 10 is segmented into four colors, green, red, blue, and pink. FIG. 6A shows the trajectory of a password wherein the starting point is green, and two revolutions are made in the clockwise direction, and FIG. 6B shows the trajectory of a password wherein the starting point is red, and one revolution is made in the counterclockwise direction. In the case of FIG. 6A, it is sufficient that the user memorizes "green, right, two" as the password, and in the case of FIG. 6B, it is sufficient that the user memorizes "red, left, one" as the password. Also, on the password being inputted as preset setting information, it is stored in the password storage section 17.

The control section 5 is configured of, for example, a CPU (central processing unit), and controls the input section 1, display section 2, storage section 3, and button group 4 by executing the control program stored in the storage section 3. The control section 5 functions as the position information allocation section, and allocates a plurality of items of the position identification information uniquely to each position of a predetermined plurality of positions in the input section 1. With regard to the position identification information corresponding to the first indicated position of the input trajectory inputted from the input section 1, the position identification information of a position indicated by the user based on the segmenting of the circle pad 10 is obtained by the control section 5. Also, the control section 5 functions as the determination section, and calculates the number of rotations and rotation direction based on the position identification information obtained, compares the starting point position when inputting the password, number of rotations, and rotation direction with the set password, and determines whether the first input position identification information, trajectory information, and movement information correspond with the set password. Then, in the event that it is determined that the starting point position when inputting the password, number of rotations, and rotation direction do not correspond with the set password, the control section 5, after determining the completion of the series of input operations with the input section, as when, for example, the user removes his or her finger, causes an error to be displayed in the display section 2 as warning information. Furthermore, the control section 5 randomly changes the position in the input section of the input device in which the position setting information is disposed for every authentication, that is, every time a password is inputted for authentication, and every time an error is displayed in the display section 2.

FIGS. 7A and 7B, and FIGS. 8 to 11, are flowcharts showing operational processes of the control section 5 for presetting a password as setting information, and for authenticating a password. When the control section 5 receives a password setting instruction from the user via the button group 4, the process proceeds from Step A0 to Step A1.

In Step A1, the control section 5 randomly determines the display colors of the segmented areas of the circle pad 10 from among the preset G (green), R (red), B (blue), and P (pink), as individual independent colors, using, for example, random numbers, distributes the colors, and the process proceeds to Step A2. As the display colors of the segmented areas of the circle pad 10 are randomly determined every time the setting or authentication of a password is started, a password leak is unlikely to occur even in the event that someone is peeping.

In Step A2, it is determined whether a password setting is already finished. If it is determined in Step A1 that the password setting is already finished, the process proceeds to Step A10, while if it is determined that the password setting is not finished, the process proceeds to Step A3.

In Step A3, the control section 5 displays a message in the display section 2 prompting an initial input of the password, and the process proceeds to Step A4.

In Step A4, the control section 5 sets to a password initial setting mode, that is, Md=1, and the process proceeds to Step A5.

In Step A5, it is determined whether the user is touching any of the segmented colored areas of the circle pad 10. If it is determined in Step A5 that no colored area is being touched, the process proceeds to Step A5, while if it is determined that a colored area is being touched, the process proceeds to Step A6.

In Step A6, the control section 5 initializes each variable number. V represents the rotation direction, 0 indicates that the finger exists in the starting position, 1 that the finger is moving in the clockwise rotation direction, and −1 that the finger is moving in the counterclockwise rotation direction. Vc represents a rotation fraction, and is incremented upon a 90° movement. Cn represents the number of rotations. Ca represents an area currently being touched, and Sa an area touched first. The control section 5 sets the variable numbers to V=0, Vc=0, Cn=0, and Ca=Sa, and the process proceeds to Step A7.

In Step A7, it is determined whether the user has removed his or her finger from the circle pad 10. If it is determined in Step A7 that the finger has been removed, the process proceeds to the password setting of Step A24 of FIG. 10, or to a password authentication control. If it is determined that the finger has not been removed, the process proceeds to Step A8. The input device 50 of the invention is such that, when the user removes his or her finger, the control section 5 determines that the input operation is completed.

In Step A8, it is determined whether a movement is to the area on the immediate right of the area currently being touched. If it is determined in Step A8 that it is a movement to the area on the immediate right of the area currently being touched, the process proceeds to Step A12 of the flowchart of FIG. 8, while if it is determined that it is not a movement to the area on the immediate right, the process proceeds to Step A9.

In Step A9, it is determined whether a movement is to the area on the immediate left of the area currently being touched. If it is determined in Step A9 that it is a movement to the area on the immediate left of the area currently being touched, the process proceeds to Step A18 of the flowchart of FIG. 9, while if it is determined that it is not a movement to the area on the immediate left, the process proceeds to Step A7.

In Step A10, the control section 5 displays a message in the display section 2 prompting an input for an authentication of the password, and the process proceeds to Step A11.

In Step A11, the control section 5 sets to a password authentication mode, that is, Md=0, and the process proceeds to Step A5.

If the control section 5 determines in Step A8 of the flowchart of FIG. 7B that it is a movement to the area on the immediate right of the area currently being touched, the process proceeds to Step A12 of the flowchart of FIG. 8, and in Step A12, the control section 5 determines whether the immediately preceding operation is a counterclockwise operation. If it is determined in Step A12 that it is a counterclockwise operation, the process proceeds to Step A33 of the flowchart shown in FIG. 11, while if it is determined that it is not a counterclockwise operation, the process proceeds to Step A13.

In Step A13, the control section 5 sets the rotation direction variable number V to V=1, and the process proceeds to Step A14.

In Step A14, the control section 5 increments Vc to Vc=Vc+1, and the process proceeds to Step A15.

In Step A15, the control section 5 sets the area currently being touched in Ca, and the process proceeds to Step A16.

In Step A16, it is determined whether the rotation fraction Vc is 4. If it is determined in Step A16 that the rotation fraction is 4, the process proceeds to Step A17, while if it is determined that the rotation fraction is not 4, the process proceeds to Step A7 of the flowchart of FIG. 7B.

In Step A17, the control section 5 sets the rotation fraction to Vc=0, and increments the number of rotations Cn, and the process proceeds to Step A7 of the flowchart of FIG. 7B.

Figure 9:
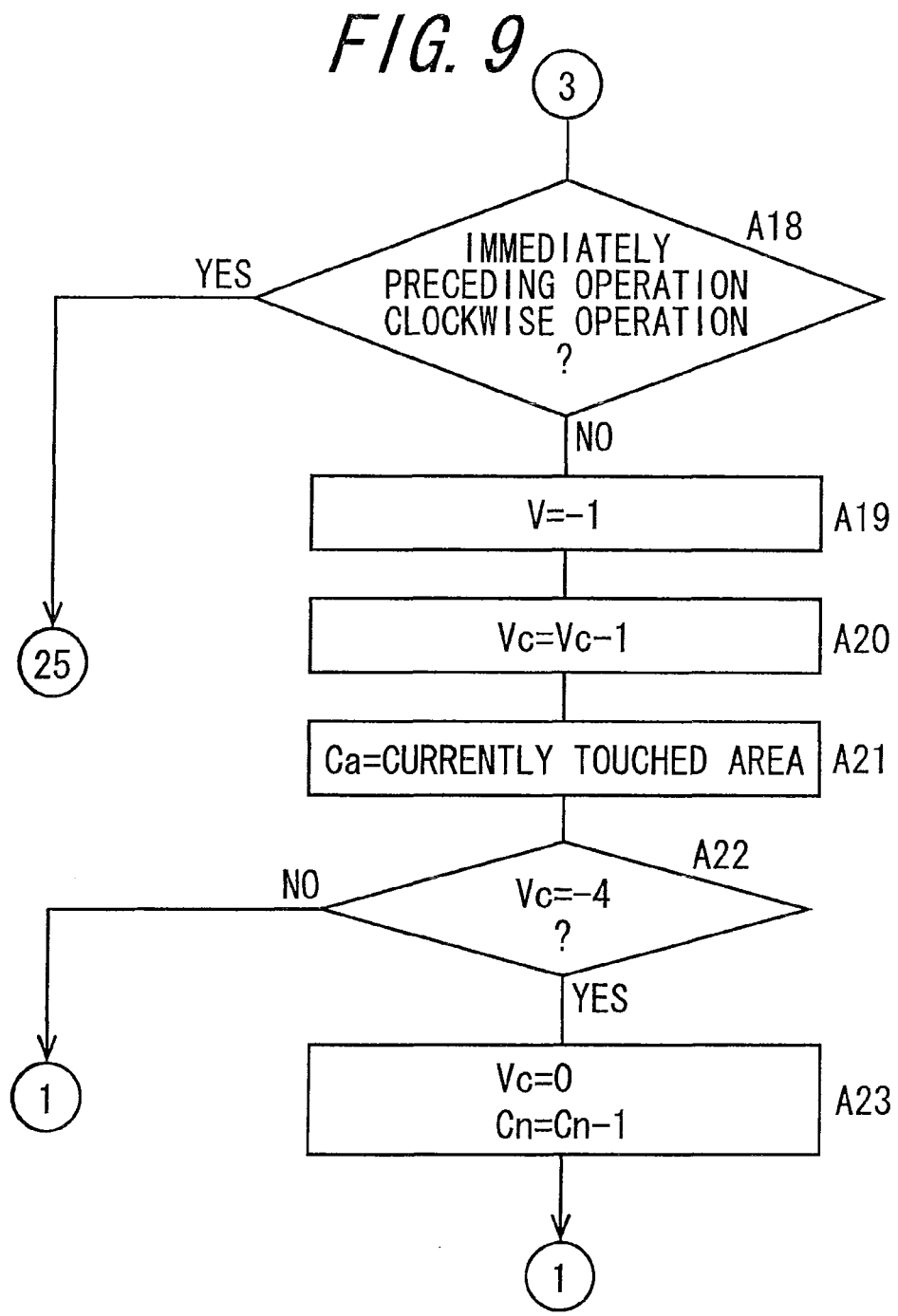
FIG. 9 is a flowchart showing operational processes of the control section.

If the control section 5 determines in Step A9 of the flowchart of FIG. 7B that it is a movement to the area on the immediate left of the area currently being touched, the process proceeds to Step A18 of the flowchart of FIG. 9, and in Step A18, the control section 5 determines whether the immediately preceding operation is a clockwise operation. If it is determined in Step A18 that it is a clockwise operation, the process proceeds to Step A33 of the flowchart shown in FIG. 11, while if it is determined that it is not a clockwise operation, the process proceeds to Step A19.

In Step A19, the control section 5 sets the rotation direction variable number V to V=−1, and the process proceeds to Step A20.

In Step A20, the control section 5 decrements Vc to Vc=Vc−1, and the process proceeds to Step A21.

In Step A21, the control section 5 sets the area currently being touched in Ca, and the process proceeds to Step A22.

In Step A22, it is determined whether the rotation fraction Vc is −4. If it is determined in Step A22 that the rotation fraction is −4, the process proceeds to Step A23, while if it is determined that the rotation fraction is not −4, the process proceeds to Step A7 of the flowchart of FIG. 7B.

In Step A23, the control section 5 sets the rotation fraction to Vc=0, and decrements the number of rotations Cn, and the process proceeds to Step A7 of the flowchart of FIG. 7B.

Figure 10:
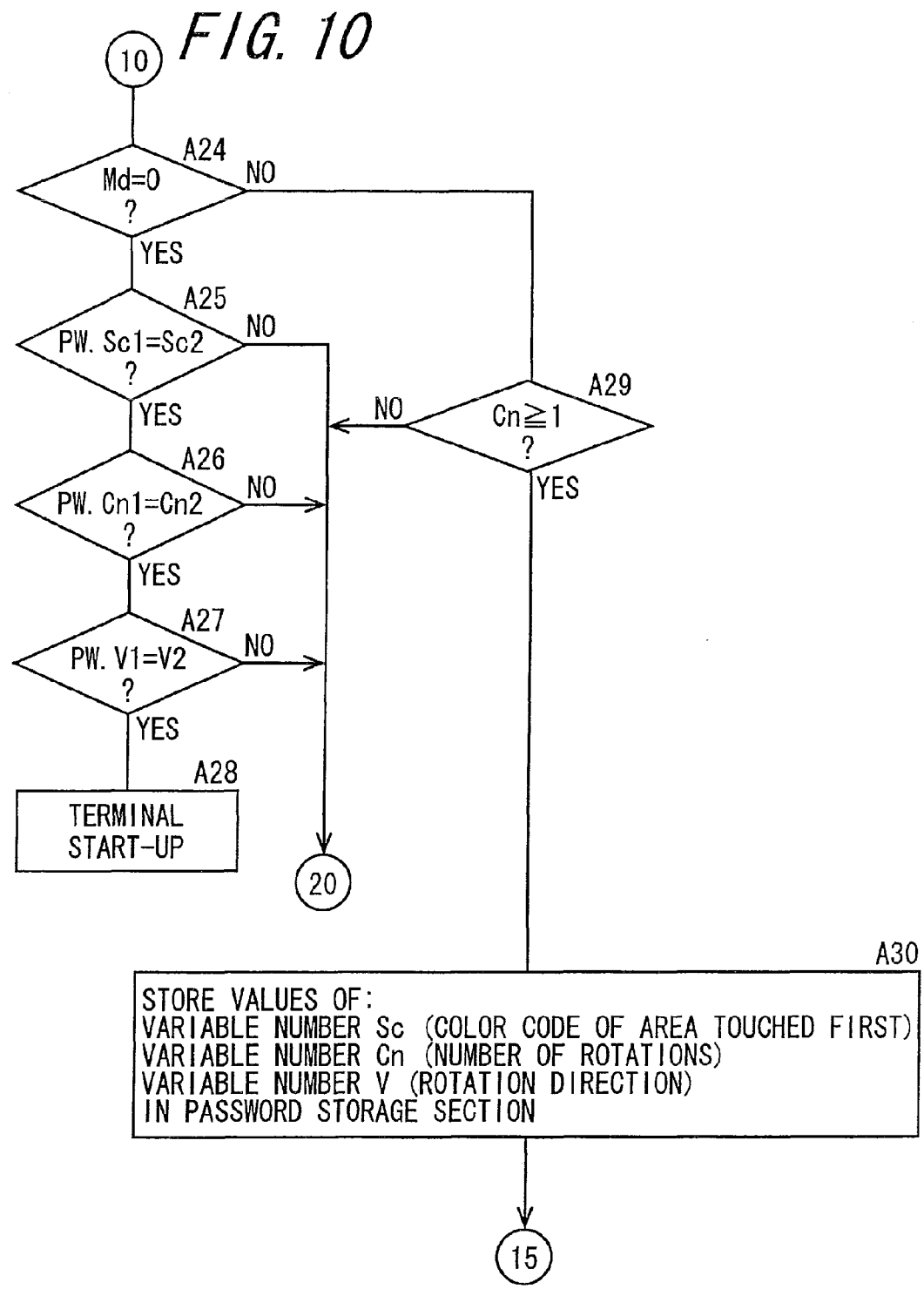
FIG. 10 is a flowchart showing operational processes of the control section.

If the control section 5 determines in Step A7 of the flowchart of FIG. 7B that the finger has been removed, the process proceeds to Step A24 of the flowchart of FIG. 10, and in Step A24, the control section 5 determines whether it is Md=0, that is, whether it is the password authentication mode. If it is determined in Step A24 that it is Md=0, the process proceeds to Step A25, while if it is determined that it is not Md=0, the process proceeds to Step A29.

In Step A25, it is determined whether a color code Sc1 of the color distributed to the area touched first of the set password, and a color code Sc2 of the color distributed to the area touched first of the password inputted for the authentication, coincide. If it is determined in Step A25 that Sc1 and Sc2 do not coincide, the process proceeds to Step A31 of the flowchart of FIG. 11, while if it is determined that Sc1 and Sc2 coincide, the process proceeds to Step A26.

In Step A26, it is determined whether the number of rotations Cn1 of the set password, and the number of rotations Cn2 of the password inputted for the authentication, coincide. If it is determined in Step A26 that Cn1 and Cn2 do not coincide, the process proceeds to Step A31 of the flowchart of FIG. 11, while if it is determined that Cn1 and Cn2 coincide, the process proceeds to Step A27.

In Step A27, it is determined whether the rotation direction V1 of the set password, and the rotation direction V2 of the password inputted for the authentication, coincide. If it is determined in Step A27 that V1 and V2 do not coincide, the process proceeds to an authenticated password input error control of Step A31 of the flowchart of FIG. 11, while if it is determined that V1 and V2 coincide, the process proceeds to Step A28.

In Step A28, a terminal is started up, an activation of each kind of button, a control of a terminal storage data display, and the like, are carried out, and the next process is started.

When it is determined in the heretofore described Step A24 that it is not Md=0, that is, when it is determined that it is the password setting mode, it is determined in Step A29 whether the number of rotations Cn is equal to or greater than 1. If it is determined in Step A29 that the number of rotations Cn is equal to or greater than 1, the process proceeds to Step A30, while if it is determined that the number of rotations Cn is not equal to or greater than 1, the process proceeds to the input error control of Step A31 of the flowchart of FIG. 11.

In Step A30, the values of the variable number Sc, which is the color code of the color distributed to the area touched first, the variable number Cn, which is the number of rotations of the password, and the variable number V, which is the rotation direction of the password, are stored in the password storage section 17, and the process proceeds to Step A1 of the flowchart of FIG. 7A.

Figure 11:
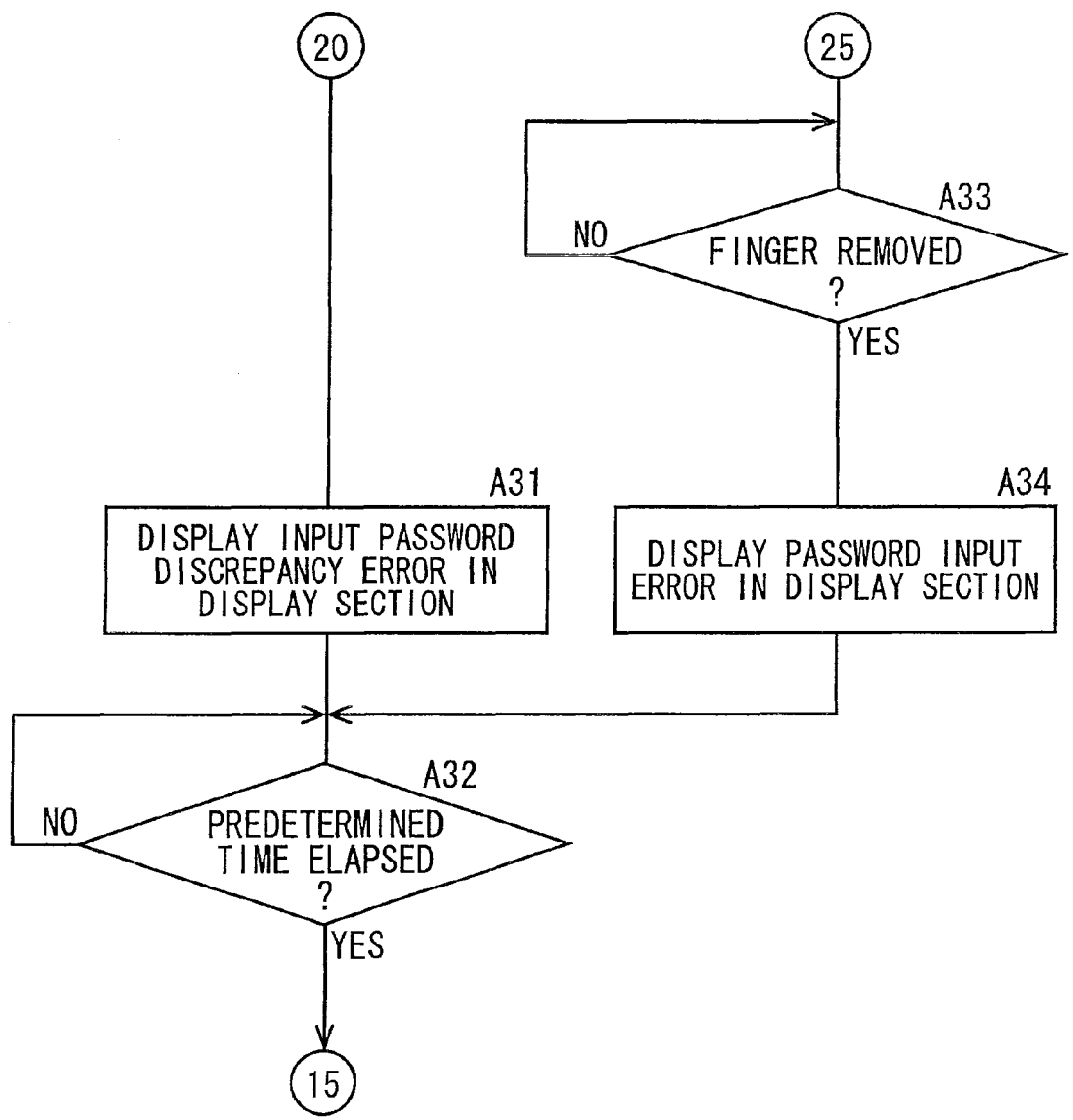
FIG. 11 is a flowchart showing operational processes of the control section.

When the control section 5 makes a negative determination in any of Steps A25, A26, A27, or A29 of the flowchart of FIG. 10, the process proceeds to Step A31 of the flowchart of FIG. 11, and the control section 5 causes a discrepancy error in the inputted password to be displayed in the display section 2, and the process proceeds to Step A32.

In Step A32, it is determined whether a predetermined time has elapsed. If it is determined in Step A32 that the predetermined time has not elapsed, Step A32 is repeated, while if it is determined that the predetermined time has elapsed, the process proceeds to Step A1 of the flowchart of FIG. 7A, and prompts the user to carry out a reauthentication.

When the control section 5 makes a positive determination in Step A12 of the flowchart of FIG. 8 or in Step A18 of the flowchart of FIG. 9, that is, when determining that it is a transition operation from a clockwise operation to a counterclockwise operation, or conversely, from a counterclockwise operation to a clockwise operation, the process proceeds to Step A33 of the flowchart of FIG. 11, and in Step A33, it is determined whether the user has removed his or her finger from the circle pad 10. If it is determined in Step A33 that the user has removed his or her finger from the circle pad 10, the process proceeds to Step A34, while if it is determined that the user has not removed his or her finger, in Step A34, the control section 5 causes a password input error to be displayed in the display section 2, and the process proceeds to Step A32. When the control section 5 causes warning information to be displayed in the display section 2 only after determining the completion of the series of input operations, that is, when the user has removed his or her finger, it is possible to make it difficult for another person to guess the password while feeling around with a finger on the circle pad 10.

In the case of adopting something simple, like inputting a circle, inputting a triangle, or the like, there is a possibility, due to being secretly watched by another person during the operation of inputting the graphic password, of the details of the graphic password being ascertained by the other person, and cases of leakage increasing, but according to the invention, as heretofore described, although the password looks like a graphic trajectory when seen by another person, as the password is configured of the first input position identification information, trajectory information, and movement information, it is unlikely for a password leak to occur even when peeped at, even amidst the existence of a large number of strangers. Also, as it is possible to easily remember the correct password due to the password being configured of three simple items, the first input position identification information, trajectory information, and movement information, the kind of situation wherein the user him or herself cannot unlock the password does not arise, and input is easy even while moving, meaning that it is possible to provide an authentication method particularly suited to application in a product which is frequently used when moving, such as a mobile telephone.

It also being possible to realize the input section as, apart from the touch panel, a rectangular touch pad as another form of the input device, it is not absolutely necessary that the touch region and display section are integrated. In this case, the touch pad normally functions as an element with which a cursor is moved, and it may also be configured so as to be able to fulfill the same functions as in the heretofore described embodiment when entering the mode of executing an authentication. By the input device including the same kind of configuration as in the heretofore described embodiment in other forms of the input device, such as a mobile telephone or portable terminal, it is possible to achieve the same advantages as with the heretofore described embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. An authentication method in which authentication is carried out based on a password including position identification information disposed in an arbitrary position in an input section of an input device from which information can be inputted, the authentication method comprising:
   acquiring position identification information corresponding to a first indicated position of an input trajectory inputted from the input section of the input device;
   calculating, based on the input trajectory, trajectory information representing repetitions of the trajectory starting from the first indicated position, and movement information representing a movement direction with respect to the first indicated position; and
   comparing the acquired position identification information, and the calculated trajectory information and movement information, with preset setting information, and determining whether they correspond to the setting information,
   the input section being divided into a plurality of input subsections, the method further comprising:
   responsive to changing the preset setting information, randomly assigning a unique display color to each of the input subsections.

2. The authentication method of claim 1, wherein the first indicated position is reset for every authentication.

3. An input device comprising an input section from which information can be inputted, the input device being capable of carrying out authentication based on a password configured from position identification information disposed in an arbitrary position in the input section, the input device comprising:
   a position information allocation section which allocates a plurality of items of the position identification information uniquely to each position of a predetermined plurality of positions in the input section;

a storage section which stores information; and a determination section which acquires position identification information corresponding to a first indicated position of an input trajectory inputted from the input section, calculates, based on the input trajectory, trajectory information representing repetitions of the trajectory starting from the first indicated position, and movement information representing a movement direction with respect to the first indicated position, and compares the acquired position identification information, and the calculated trajectory information and movement information, with preset setting information stored in the storage section, and determines whether they correspond to the setting information, the input section being divided into a plurality of input subsections, said position information allocation section randomly assigning a unique display color to each of the subsections responsive to changing the preset setting information.

4. The input device of claim 3, further comprising an output section, wherein in the event that it is determined that the acquired position identification information and the calculated trajectory information and movement information do not correspond to the setting information, the determination section, after determining completion of a series of input operations with the input section, causes warning information to be outputted in the output section.

5. The authentication method of claim 1, wherein the input trajectory is a clockwise/counter clockwise (CW/CCW) rotational input trajectory, said calculating step calculating, based on the input CW/CCW rotational trajectory, trajectory information representing repetitions of the CW/CCW rotational trajectory starting from the first indicated position.

6. The input device of claim 3, wherein the input trajectory is a clockwise/counter clockwise (CW/CCW) rotational input trajectory, said determination section calculating, based on the input CW/CCW rotational trajectory, trajectory information representing repetitions of the CW/CCW rotational trajectory starting from the first indicated position.

7. The authentication method of claim 1, wherein the trajectory information representing repetitions of the trajectory starting from the first indicated position includes fractional repetitions of the trajectory.

8. The input device according to claim 3, wherein the trajectory information representing repetitions of the trajectory starting from the first indicated position includes fractional repetitions of the trajectory.

* * * * *